United States Patent
Ross et al.

(10) Patent No.: US 7,246,880 B2
(45) Date of Patent: Jul. 24, 2007

(54) METHOD FOR BLACK PIXEL DESIGNATION IN DOCUMENT IMAGE DATA

(75) Inventors: George C Ross, Philomath, OR (US); Jason M. Quintana, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 11/044,859

(22) Filed: Jan. 26, 2005

(65) Prior Publication Data

US 2006/0092223 A1 May 4, 2006

Related U.S. Application Data

(60) Provisional application No. 60/623,408, filed on Oct. 29, 2004.

(51) Int. Cl.
*B41J 2/21* (2006.01)
(52) U.S. Cl. .............................. 347/43; 347/14; 347/15
(58) Field of Classification Search ............. 347/43, 347/14
See application file for complete search history.

(56) References Cited

U.S. PATENT DOCUMENTS

| | | | |
|---|---|---|---|
| 5,428,383 A | 6/1995 | Shields et al. | |
| 5,475,800 A * | 12/1995 | Vaughn et al. | 358/1.9 |
| 5,536,306 A | 7/1996 | Johnson et al. | |
| 5,568,169 A | 10/1996 | Dudek et al. | |
| 5,809,215 A | 9/1998 | Heydinger et al. | |
| 6,064,493 A * | 5/2000 | Neff | 358/1.9 |
| 6,259,536 B1 * | 7/2001 | Coleman | 358/1.9 |
| 6,290,330 B1 | 9/2001 | Torpey et al. | |
| 6,343,847 B1 | 2/2002 | Torpey et al. | |
| 6,354,693 B1 | 3/2002 | Looman et al. | |
| 6,707,564 B1 * | 3/2004 | Fujimoto et al. | 358/1.14 |
| 6,753,976 B1 | 6/2004 | Torpey et al. | |
| 2003/0079651 A1 | 5/2003 | Rehman | |

FOREIGN PATENT DOCUMENTS

| | | |
|---|---|---|
| EP | 0971309 | 1/2000 |
| EP | 1014299 | 6/2000 |
| EP | 0782098 | 6/2003 |
| EP | 0707281 | 3/2004 |

OTHER PUBLICATIONS

European Search Report dated Feb. 16, 2006.

* cited by examiner

*Primary Examiner*—Thinh Nguyen
(74) *Attorney, Agent, or Firm*—Dicke, Billig, & Czaja, P.L.L.C.

(57) ABSTRACT

Embodiments of the present invention are directed to a method of processing document image data for printing. The method comprises rasterizing all objects in the document image data into a bitmap format including designating black portions of the objects as composite black pixels. Color objects are identified in the document image data that contain color or are adjacent to color. All composite black pixel designations in the identified color objects are maintained as composite black pixel designations without substitution to true black pixel designations. Print data is generated in which the composite black pixel designations will be half-tone printed on a print medium as a portion of composite black ink and a portion of true black ink.

23 Claims, 4 Drawing Sheets

METHOD FOR BLACK PIXEL DESIGNATION IN DOCUMENT IMAGE DATA

RELATED APPLICATIONS

This application claims priority of U.S. Provisional Application Ser. No. 60/623,408 of George C. Ross et al. filed 29 Oct. 2004 and titled "METHOD FOR BLACK PIXEL DESIGNATION IN DOCUMENT IMAGE DATA".

BACKGROUND

Liquid ink printers, such as inkjet printers, place many small dots or drops of ink into very close proximity to each other on a print medium, such as plain paper, photo paper, etc. With little time to dry, different colored inks often bleed into each other on paper. Bleeding results from many factors including differing properties of different types of ink, such as pigment-based inks as compared to dye-based inks, as well as the type of media (such as photo paper or plain paper) onto which the ink is printed. Similarly, inks are carried in different vehicle formulations, such as non-reactive formulations and reactive formulations, which may include or omit salts, acids, or other additives. These differing properties affect many aspects of the appearance of each ink on the paper, such as edge quality, tone, etc. In one example, black inks and/or color inks are modified to be reactive, thereby causing a chemical reaction with each other as part of a bleed-reduction mechanism at a black-color interface.

Black-color bleeding results in color shift, ragged edges, as well as degradation of other print quality parameters. Maintaining optimal print quality (e.g. edge crispness, uniform tone, etc) for each color ink and for black inks is generally accomplished in different ways so that achieving optimal print quality for black text/objects may conflict with achieving optimal print quality for color text/objects. This conflict caused by different solutions for controlling ink/paper behavior has led to other hardware adaptations, such as maintaining separate sets of nozzles in printheads, one set for color and another set for black. In other words, one or more printheads have one orifice plate of nozzles for color inks and another separate orifice plate of nozzles for black inks. While this arrangement prevents cross-contamination of color and black inks at the nozzles, it also increases the complexity, size and cost of the printhead.

For these reasons, and many others, printers still face the challenge of placing color and black inks together on print media in a way that achieves optimal print quality for both the color ink and the black ink.

SUMMARY

Embodiments of the present invention are directed to a method of processing document image data for printing. The method comprises rasterizing all objects in the document image data into a bitmap format including designating black portions of the objects as composite black pixels. Color objects are identified in the document image data that contain color or are adjacent to color. All composite black pixel designations in the identified color objects are maintained as composite black pixel designations without substitution to true black pixel designations. Print data is generated in which the composite black pixel designations will be half-tone printed on a print medium as a portion of composite black ink and a portion of true black ink.

DETAILED DESCRIPTION

Figure 1:
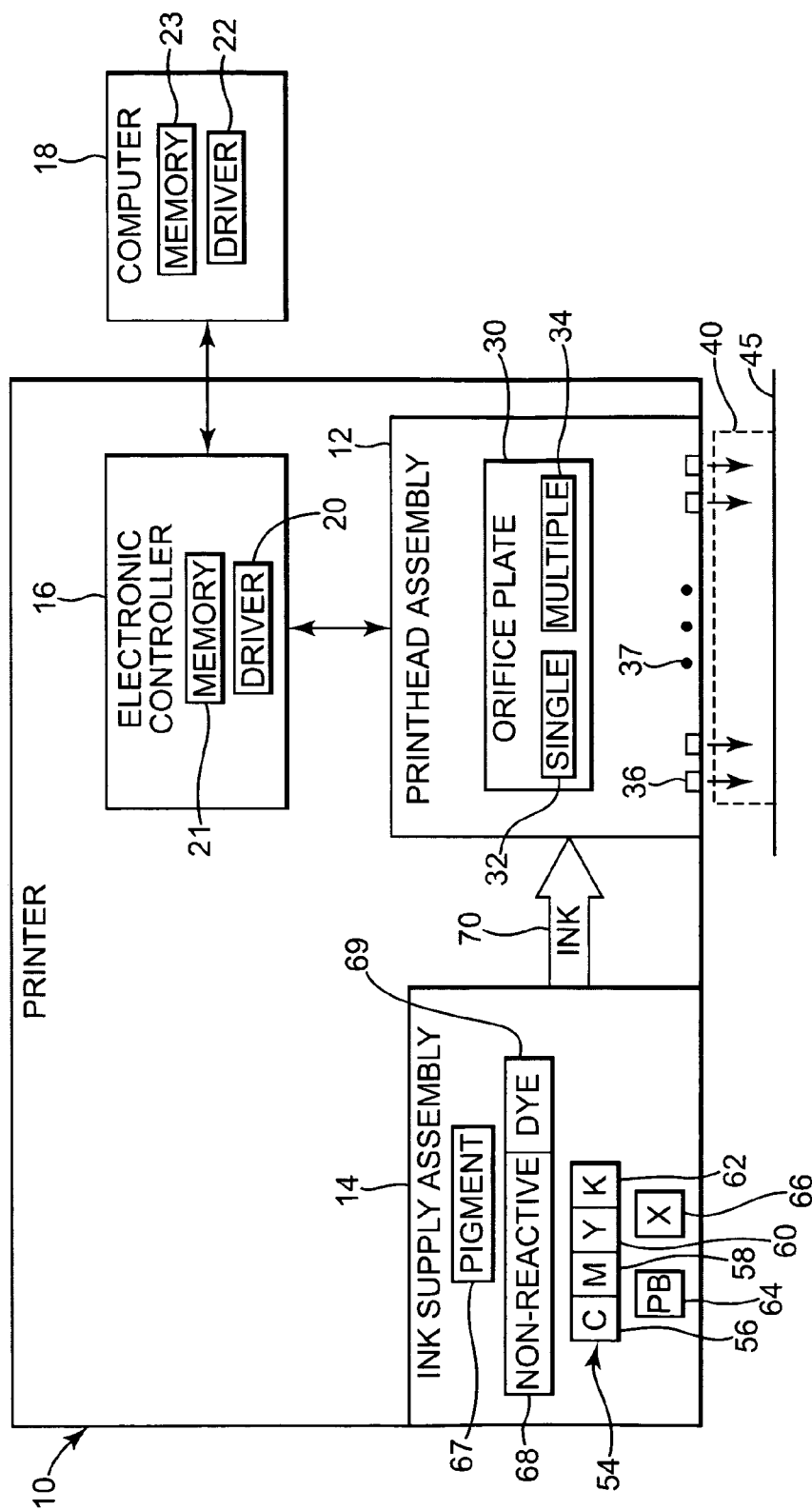
FIG. 1 is an block diagram of a printer, according to an embodiment of the present invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to rapid processing of document image data for printing while minimizing ink bleed at black-color interfaces. These embodiments enable fast processing by identifying objects (e.g., text objects or vector graphics objects) in which, or near which, a black-color interface will occur, and then designating in the document image data that all of the black pixels in those identified objects will be printed as color-based, composite black pixels instead of astrue black pixels. Print data is then generated to execute printing of those designated pixels.

In one embodiment, text objects and vector graphics objects in the document image data are converted to a raster format (e.g. bitmap data) in which each pixel in the document image data corresponds to a 24 bit tri-color combination, such as RGB data. In some instances, this tri-color designation comprises a color plane (i.e. palette) of cyan, magenta, and yellow. Using this scheme, all portions of the text objects and vector graphics objects are converted into the raster format as pixels corresponding to some combination of the colors of the tri-color plane(s). For example, black portions of the text objects and/or vector graphics objects are converted to composite black pixels, which corresponds to a black made of cyan, magenta, and yellow. In a data format, this designation is commonly referred to as CMY (0,0,0) or RGB (0,0,0).

To enhance the quality of black printed in the document, these composite black pixels undergo a black extraction step which includes substituting the composite black pixel designation (CMY) with a new designation as a true black pixel (K) which causes printing of those pixels as a true black ink. This black extraction (e.g. substitution) includes changing the tri-color pixel designation for each black pixel location from a composite black pixel (e.g., CMY (0, 0, 0) RGB (0, 0, 0)) to a null value or white pixel value (e.g. CMY (255, 255, 255), or RGB (255, 255, 255)) and then adding a true black component at that pixel location. Adding a true black component is achieved by adding a true black color plane (K) to the document image data in which a one-bit value (e.g. 1=on, 0=off) designates whether true black ink will be printed at each pixel location. For each substitution of composite black pixels to a true black pixel, that pixel location is designated with an "on" pixel for true black ink. Accordingly, by using this black extraction step, true black ink is printed at as many places as possible to enhance black printing in the document.

However, in order to prevent bleeding at a black-color interface, embodiments of the invention suspend or override this black extraction step for all black pixels in color objects, i.e., objects that contain color or objects that are adjacent to color.

In one embodiment, a printer driver maintains the designation of all of the black pixels in the identified color objects as composite black pixels instead of being converted to a true black pixel. Embodiments of the present invention designate all black pixels in the identified color objects to have the same type of black pixel designation instead of attempting to designate black pixels on a pixel-by-pixel basis at the black-color interface. Accordingly, in embodiments of the invention, some pixels designated to remain as composite black pixels (instead of being extracted to a true black pixel) will be at a black-color interface, and the suspension of the black extraction will thereby minimize black-color bleed at that interface. Other pixels in the identified color objects will be remote from a black-color interface (and would not be affected black-color bleeding even with a true black ink at that location), but keep theiromposite black pixel designation to expedite processing of the document image data.

Black pixels in the document image data that fall outside of these identified objects, such as within non-color objects, are printed according to conventional printer driver protocols, which typically designate use the black extraction step to cause these ordinary black pixels to be printed as pure black or true black (K) ink instead of as composite black ink (CMY or CMYK).

Embodiments of the present invention result in fast processing since they can be implemented in one-pass printing, and treat all black pixels in identified color objects in the same manner instead of attempting to modify only black pixels immediately adjacent each black-color interface. Accordingly, this object-oriented method effectively employs regional-based designation of all black pixels as composite black pixels in objects identified as having color or adjacent to (e.g. overlapping, bordering, close to) color. These features reduce the complexity, processing time, and cost associated with printer drivers.

FIG. 1 is a block diagram of a printer 10. As shown in FIG. 1, printer 10 comprises printhead assembly 12, ink supply assembly 14, electronic controller 16. In one embodiment, computer 18 is in electrical communication with printer 10 via controller 16.

Controller 16 comprises printer driver 20 while computer 18 comprises printer driver 22. Computer 18 is in electrical communication with electronic controller 16. In one embodiment, printer driver 22 of computer 18 can provide all printer driver functions without printer driver 20 of controller 16, or act in cooperation with printer driver 20 of controller 16. In another embodiment, printer driver 22 of computer 18 can provide all printer driver functions without printer driver 20 of controller 16, or act in cooperation with printer driver 20 of controller 16. Accordingly, functions and features described in association with printer driver 20 will also be attributed to printer driver 22, and vice versa. Printer driver 20 is stored in memory 21 of electronic controller 16 while printer driver 22 is stored in memory 23 of computer 18.

Printer driver 20 and/or printer driver 22 act to convert document image data, such as vector graphic objects and/or text objects, into bitmap data for printing by printhead assembly 12. As will be explained in more detail in association with FIGS. 2–6, printer driver(s) 20, 22 perform this bitmap conversion in a manner that minimizes bleed between black pixels and color pixels on a document by managing the printing for all black pixels (or substantially all black pixels) in color objects, i.e., objects containing color and/or objects adjacent to color. For example, in one embodiment, printer driver 20, 22 minimizes black-color bleed by designating all black pixels in the identified color objects to be printed as composite black pixels made from color inks (e.g., cyan, magenta, and yellow) instead of as true black ink (K) as conventionally occurs through a black extraction step. In one embodiment, this composite black ink is further designated for half-tone printing as a combination of composite black (CMY) ink and true black (K) ink.

Printhead assembly 12 comprises, among other things, orifice plate 30 and nozzles 36 for printing ink 37 through print zone 40 onto print medium 45. In one embodiment, orifice plate 30 comprises single orifice plate 32 in which all of the inks from ink supply assembly 14 are jetted onto medium 45 through single orifice plate 32. In another embodiment, orifice plate 30 comprises multiple orifice plates 34 in which some of the inks from ink supply assembly 14 (e.g. color inks) are jetted onto medium 45 through a first orifice plate and other inks from ink supply assembly 14 (e.g. black inks) are jetted onto medium 45 through a second orifice plate separate from the first orifice plate. Separation of the multiple orifice plates 34 prevent cross-contamination of the inks associated with one orifice plate relative to inks associated with another separate orifice plate.

Ink supply assembly 14 comprises ink bank 54 including cyan ink (C) 56, magenta ink (M) 58, yellow ink (Y) 60, true black (K) 62. In one embodiment, ink supply assembly 14 comprises additional inks including photo black (PB) 64 and/or auxiliary ink (X) 66 (e.g., a second type of true black ink or additional color ink). In other embodiments, these additional inks are omitted so that the color plane (i.e., color palette) includes only cyan, magenta, yellow and true black.

Ink bank 54 supplies a combination of inks in cyan, magenta, and yellow to enable a full color palette (e.g., three planes of different colors) using subtractive coloration, as known in the art. A complete mixture of cyan, magenta, and yellow produces a composite black (CMY) ink, which is sometimes referred to as process black ink. In order to increase black print quality, conventionally print drivers jet true black (K) ink 62 onto medium 45 via printhead assembly 12 instead of composite black ink. Moreover, when medium 45 is a photo paper, many printers jet a photo black (PB) ink onto medium (via printhead assembly 12) instead of true black (K) ink or composite black (CMY) ink.

In other embodiments, ink supply assembly 14 is not limited to a CMYK (cyan, magenta, yellow, true black) color plane, as other color planes known in the art can be used to achieve desired coloration and black printing of print media.

In one embodiment, as shown in FIG. 1, inks 56–66 are non-reactive inks 68 and dye-based inks 69. Non-reactive inks 68 refer to inks that have not been modified to cause a conventional bleed-reduction reaction between black inks and color inks. In another embodiment, inks (56–66) are all pigment-based, non-reactive inks. Moreover, in other embodiments, inks (56–66) comprise non-reactive inks including one or more pigment inks (e.g., true black ink (K)) and one or more dye-based inks (e.g. cyan, magenta, and/or yellow).

Ink supply assembly 14 is in communication with printhead assembly 12 so that ink 70 flows into printhead assembly 12 to supply nozzles 36 with ink 37 for jetting onto medium 45. In one embodiment, ink supply assembly 14 is separate from printhead assembly 12 while in other embodiments, ink supply assembly 14 is integral with printhead assembly 12. Moreover, inks (56–62) in ink bank 54 are each contained within separate reservoirs together in a single housing, or contained in separate reservoirs in multiple housings. For example, in one embodiment, cyan, magenta, and yellow are contained in separate reservoirs within a single housing and each black (true black (K) and photo black (PB)) are each contained within their own housings. In another embodiment, both colors and blacks, while contained within separate reservoirs are located within a single housing that cooperates with printhead assembly 12.

Finally, embodiments of the present invention are not strictly limited to the configuration of the ink supply assembly and printhead assembly illustrated in FIG. 1, but extend to other combinations of ink reservoirs, ink supply assemblies, printheads, and printhead assemblies, in separate or integral cartridge forms.

Figure 2:
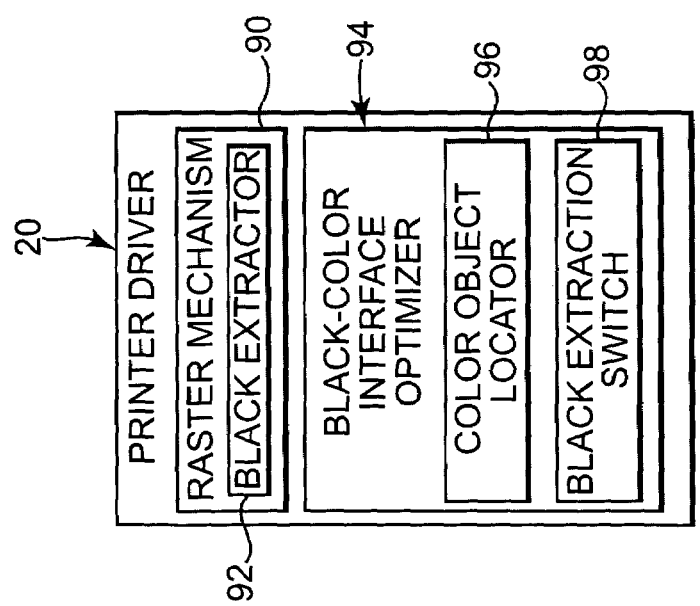
FIG. 2 is a block diagram of a printer driver, according to an embodiment of the present invention.

FIG. 2 is a block diagram of printer driver 20 comprising, among other things, raster mechanism 90 and black-color interface optimizer 94. Raster mechanism 90 is configured to perform conversion of objects, such as text objects and/or vector graphics objects, in the document image data from their vector format into bitmap format for printing by a printing mechanism. Raster mechanism 90 comprises black extractor 92, which is configured to control the addition of true black ink (K) 62 to enhance printing quality of black portions of a document. In particular, as previously described, a black extraction scheme deactivates a composite black pixel designation (e.g., a tri-color ink combination that produces black) at a given pixel location and adds a true black pixel designation (e.g. a true black ink) in its place.

Black-color interface optimizer 94 acts in cooperation with, or is part of, raster mechanism 90 and comprises several modules including, among other things, a color object locator 96 and a black extraction switch 98. In other embodiments, color object locator 96 is not located within black-color interface optimizer 94 or within raster mechanism 90 but is located elsewhere in printer driver 20, 22 while still being accessible for use with black-color interface optimizer 94 and/or black extraction switch 98.

Color object locator 96 comprises a module or aspect of printer driver 20 that identifies: (1) vector objects (text objects and/or graphics objects) that contain color; or (2) vector objects (text objects and/or graphics objects) that overlap another vector object or bitmap region that contains color. Overlapping objects have any one or more of several types of interfaces, such as objects that share a border with each other, that are close to each other but do not border each other, and/or that have one object extending into or overlaying onto top (or underlaying) the other object. Moreover, two or more objects may overlap with each other in one or more different ways so that there can be one or more different types of interfaces or overlaps that provide an opportunity for black-color bleeding. Accordingly, in this manner, color object locator 96 indirectly identifies interfaces at which color and black pixels will be printed in near proximity to each other, so that bleeding between black inks and color inks can be prevented or mitigated at these locations.

In one embodiment, color object locator 96 identifies whether an object has color or is near color in document image data by examining header information or meta-data within each text object and/or vector graphics object. This header information for each object includes, among other things, parameters about colors within the object, size/shape parameters of the object, and location of the object on the document image. With this information, color object locator 96 of printer driver 20, 22 quickly determines whether an object has color or is near color, and designates the object for treatment as a color object (or adjacent-color object) or for treatment as a non-color object.

In another embodiment, color object locator 96 enables identification of an object as containing color by finding one or several color pixels in an object. Once this determination has been made, color object locator 96 discontinues its searching and identification process, thereby avoiding unnecessary pixel-by-pixel comparisons throughout the entire object, as is conventionally performed in searching for each and every black-color interface in objects in order to apply a bleed-minimizing technique.

Black extraction switch 98 comprises a module or aspect of printer driver 20, 22 that uses information generated by color object locator 96 to modify the type of black ink printed for objects identified as containing color or overlapping other objects containing color. In particular, for each of these identified color objects, black extraction switch 98 overrides or suspends the actions of black extractor 92 for all black pixels in those identified color objects and adjacent-color objects. For each identified object, black extraction switch 98 causes the bitmap conversion to maintain the designation of all black pixels as composite black pixels instead of being modified to true black pixels (via black extractor 92).

In one embodiment, these composite black pixels in the identified color objects are half-tone printed with each designated black pixel including a portion of composite black (CMY) ink and a portion of true black (K) ink. By mixing a composite black ink (CMY) with a pure black ink, the vehicle formulation (e.g. surfactants, etc) of the pure black ink is modulated by the vehicle formulation of the composite ink, thereby causing the half-toned black pixel to have a modified vehicle formulation resulting in the half-tone black pixel ink to similar enough to the color ink pixels to prevent bleeding between the color inks and the half-tone black pixel inks.

Black-color interface optimizer 94 effectively minimizes the number of black-color interfaces at which bleeding might occur. Accordingly, in embodiments which use non-reactive inks for both black inks and color inks a single orifice plate of a printhead assembly can be used to jet the black inks and color inks in close proximity to each other, since the black inks and color inks will not react with each other at the nozzles of the orifice plate.

Figure 3:
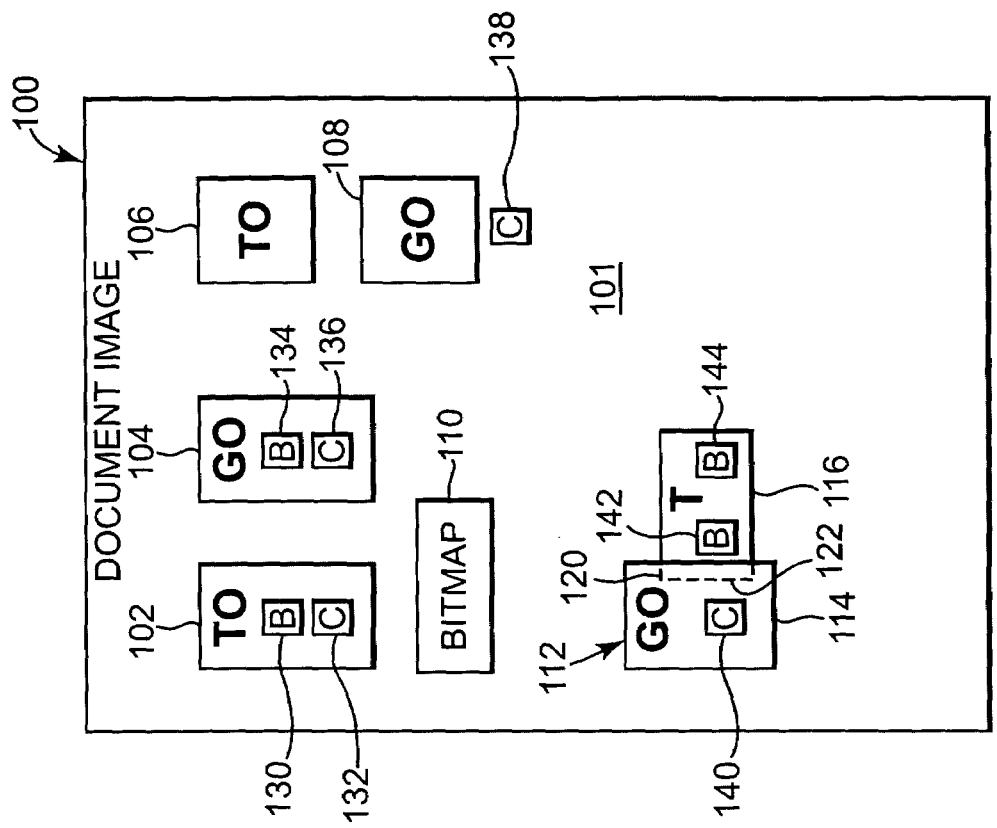
FIG. 3 is a diagram graphically representing document image data, according to an embodiment of the present invention.

FIG. 3 is a graphical representation of a document image to be processed by a printer driver for printing according to an embodiment of the invention. As shown in FIG. 3, document image model 100 comprises several elements on print media 101. These elements represent first text object (TO) 102, first graphics object (GO) 104, second text object (TO) 106, second graphics object (GO) 108, bitmap area 110, third graphics object (GO) 114 and third text object (TO) 116, which combine to form combined element 112, and color bitmap area 138. Document image 100 is merely illustrative of one example of a document image to be processed for printing by printer driver 20. In other embodiments, document image 100 can have more or less than the number of text objects, graphics objects, and/or bitmap regions than those shown in FIG. 3. Moreover, in another embodiment, document image 100 to be processed for printing by printer driver 20 can have only one type of printable element (e.g. only one of bitmap region, a text object, or a graphics object) or any combination of two or more of these types of elements. Accordingly, bitmap region 110, text objects 102, 106, and 116, as well as graphics objects 104, 108 and 114 represent just one example of the types and numbers of elements in document image 100.

First text object 102 comprises black-only elements 130 and color elements 132 while first graphics object 104 comprises black-only element(s) 134 and color elements 136. In one embodiment, black-only elements 130, 134 and color-only elements 132, 136 can be mixed together, respectively, in each of text object 102 and graphic object 104 instead of being separate elements. Second text object 106 and second graphics object 108 each comprise an object including black-only elements to be printed. Bitmap region 110 represents a printable element is ready for printing by printhead assembly 12 without conversion from an object-level to bitmap-level, and can include black and/or color.

Third graphics object (GO) 114 overlaps third text object 116 at overlap region 120 to form element 112. Third graphics object (GO) 114 comprises color element(s) 140 while text object (TO) 116 comprises black-only element 142 that is adjacent third graphics object 114 and black-only element(s) 144 located remotely from graphics object 114.

This overlap region represents many variations of overlapping in which: (1) a border or portion of text object 116 can touch a border of graphics object 114; (2) a border or portion of text object 116 can extend into (over or under) graphics object 114 (represented by line 122); or (3) a border or portion of text object 116 such as the border of black-only element 142 is adjacent to, but does not touch or extend into, graphics object 114.

In another embodiment, combined element 112 in document image 100 comprises a combination of two text objects that overlap each other or a combination of two graphics objects that overlap each other. Instead of having just one of text object 116 or graphics object 114

Figure 4:
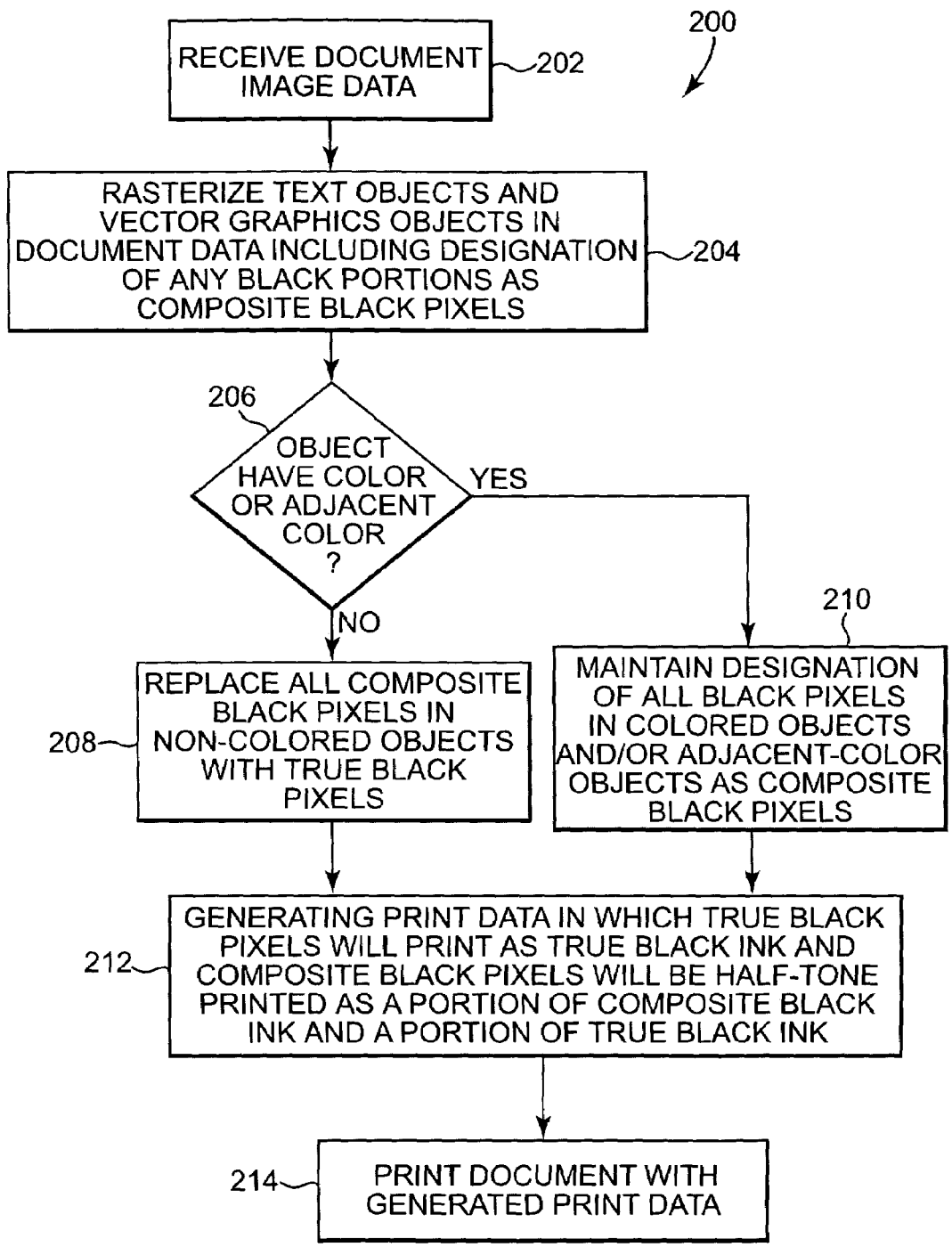
FIG. 4 is a flow diagram of a method of processing document image data, according to an embodiment of the present invention.

FIG. 4 is a flow diagram of a method 200 of processing document image data, according to an embodiment of the invention. In one embodiment, method 200 is performed using printer 10 including printer drivers 20, 22, with all the features and attributes described in association with FIGS. 1–3, and 5–6 for printer drivers 20, 22. In other embodiments, method 200 is performed by printers and/or printer drivers known in the art that are modified to perform method 200.

As shown in FIG. 4, at 202, the method comprises receiving document image data from a source, such as a memory of a printer, a computer associated with a printer, etc.

At 204, text objects and vector graphics objects in document image data are rasterized from their raster format to a bitmap format. This bitmap conversion includes designating any black portions of these text objects and/or graphics objects with composite black pixel values. Any bitmap portions already in the document image data are not addressed by method 200.

At 206, the method comprises identifying objects (text objects and/or graphics objects) in document image data (e.g., data corresponding to document image 100) that contain color or are adjacent to (e.g., overlaps, borders with, or in close proximity to) objects that contain color. In one embodiment, this identification is performed by color object locator 96 of printer driver 20, in the manner as previously described in association with FIG. 2.

If an object does not have color, as shown at 208, a black extraction step is applied to the non-color object to replace all composite black pixels in the non-color object with true black pixels. These true black pixels designate printing of black pixels in the non-color object with a true black ink (K) from a true black color plane. The value for black pixel locations in the tri-color plane associated with these non-color objects is set to a null value or white. In one embodiment, this black extraction step is performed by black extractor 92 of printer driver 20, 22, as previously described in association with FIG. 2.

However, if an object does have color, or is adjacent color, as shown at 210, all black pixels in the identified color objects and adjacent-color objects in the document image data are prevented from undergoing black extraction to true black pixels (as described at 208). Instead, these color objects and adjacent-color objects maintain their designation as composite black pixels. Composite black ink pixels in the bitmap data stream represent black achieved by combining cyan, magenta, and yellow to yield composite black.

In one embodiment, this suspension or overriding of the black extraction mechanism is performed by black extraction switch 98 of printer driver 20.

This feature of maintaining composite black pixel designations in color objects and adjacent-color objects to minimize black-color bleeding is applied to all black pixel locations within those color objects and adjacent-color objects and not just to black pixels at a black-color interface, as will be described in more detail in association with FIGS. 5–6. In another embodiment, this composite black pixel designation is applied to substantially all black pixels (rather than all black pixels) in the identified object, allowing for exceptions as directed by printer driver 20, 22 for other reasons unrelated to minimizing ink bleed at black-color interfaces.

At 212, method 200 comprises generating print data in which true black pixels (in non-color objects) will be printed as true black ink and in which composite black pixels (in color objects and adjacent-color objects) will be half-tone printed as a portion of composite black ink (including cyan, magenta, and yellow) and a portion of true black ink (K). For the half-tone printed composite black pixels, the true black ink takes on more of properties of vehicle formulation of composite black ink, thereby mitigating bleed between color and black inks. Moreover, the feature of mixing a true black ink with a composite black ink effectively averages the vehicle formulations of the two different types of black ink, which brings the properties of the true black ink close enough the properties of the color inks to diminish bleeding between the respective black and color inks.

As further shown by FIG. 4, at 214, in one embodiment method 200 further comprises printing a document with the generated print data. In one embodiment, the generated print data is a bitmap data stream. In other embodiments, the generated print data comprises other formats of printable data, as known in the art.

Figure 5:
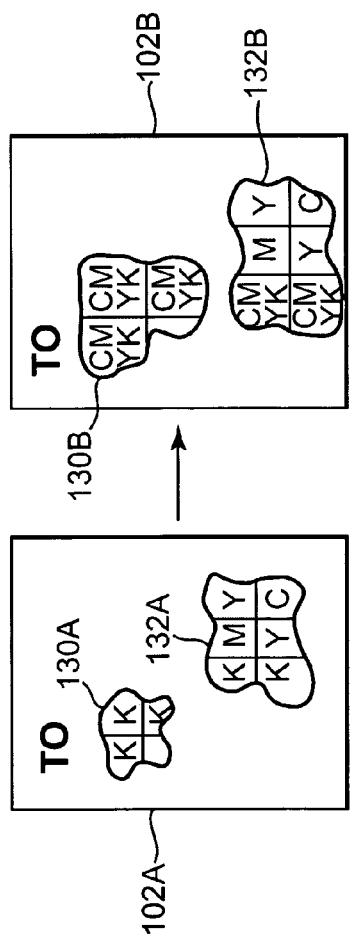
FIG. 5 is a graphic representation of document image data with, and without, application of a method of processing document image data, according to an embodiment of the present invention.

FIG. 5 is a diagram illustrating a text object 102 in a document image 100 (e.g., text object 102 in FIG. 3). As shown in FIG. 5, a conventionally processed text object 102A is compared to a text object 102B processed according to embodiments of the present invention, such as printer driver 20 and method 200. As shown in FIG. 5, text object 102A represents a text object with color as would conventionally be processed using a black extraction step, in which a composite black pixel is replaced by a true black pixel. Text object 102A comprises element 130A with true black pixels (K) and element 132A with various color pixels (e.g. magenta (M), cyan (C), and yellow (Y)) and true black pixels (K). As shown in text object 102A, with conventional processing via black extraction, even black pixels immediately adjacent color pixels (as shown in element 132A) remain true black pixels, thereby contributing to black-color bleed.

In contrast, text object 102B represents a text object that has been identified as including color and processed by application of method 200 (FIG. 4) and/or use of printer driver 20 with raster mechanism 90 and/or black-color interface optimizer 94 (FIG. 2). As shown in FIG. 5, all black pixels in text object 102B will maintain their designation as composite black pixels (CMY), after initial rasterization into a bitmap format (e.g. RGB 24 bit format), instead of being converted to true black pixels (K), as would otherwise occur in a black extraction step. As shown in FIG. 5, these composite black pixels were further designated (or converted) for half-tone printing as a combination of both true black pixels (K) and a composite black pixel group of cyan (C), magenta (M), and yellow (Y). As shown in FIG. 5, element 132B in text object 102B includes half-tone black pixels (CMYK) immediately bordering the color pixels M and Y in order to minimize bleed between the color pixels (M and Y) relative to the black pixels now set as half-tone pixels (CMYK).

In addition, pixels at 130B, which are located away from the proximity of the black-color interface (shown in element 132B) in the object also maintain their designation for printing as composite black pixels (CMYK) in the interest of rapid processing, thereby avoiding the conventional pixel-by-pixel analysis that identifies every potential black-color interface. In particular, instead of searching for every black pixel that is adjacent a color pixel, this method can rely on the printer driver to find any color within an object, and thus trigger wholesale designation of all (or substantially all) black pixels within that object to be composite black pixels. This simplified object-oriented designation feature, focused on regional, black-pixel designation uniformly within an object, decreases the complexity and cost of the printer driver.

Figure 6:
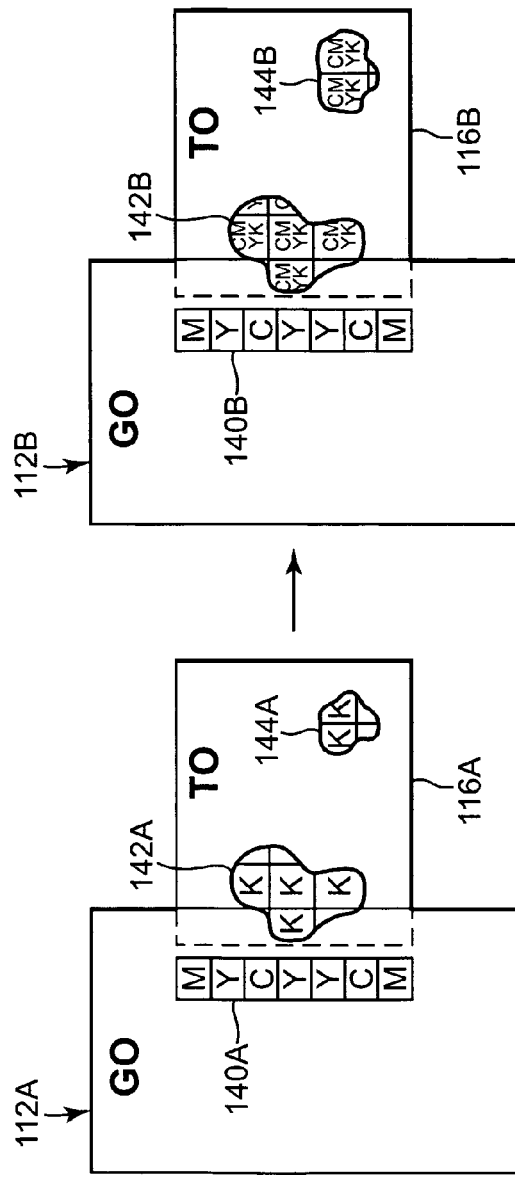
FIG. 6 is a graphic representation of document image data with, and without, application of a method of processing document image data, according to an embodiment of the present invention.

FIG. 6 is a diagram illustrating a combination 112A of a non-color text object 116 (see element 116 in FIG. 3), that overlaps a graphics object 114 (see element 114 in FIG. 3) containing color. Graphics object (GO) 114A comprises color element 140A including color pixels of magenta, yellow, and cyan (M, Y, and C) combined in a string. Element 140A can have the color pixels arranged in any order. As shown in FIG. 6, this color element 140A is adjacent black element 142A of text object 116A by virtue of an overlap (underneath or over the top) of text object 116A relative to graphics objects 114A. This overlap is also represented by line 120 in FIG. 3.

FIG. 6 represents a comparison between a text object 116A conventionally processed via a black extraction technique and a text object 116B processed according to printer driver 20 and/or method 200 in embodiments of the present invention. As shown in FIG. 6, text object 116A represents a text object adjacent to color as would conventionally be processed using a black extraction step, in which a composite black pixel is replaced by a true black pixel.

As shown in FIG. 6, conventionally processed text object (TO) 116A comprises element 142A with true black pixels and element 144A with true black pixels (K). Conventional printer drivers would print these black pixels via a black extraction step (such as with black extractor 92) as true black pixels (K) to increase the black text printing quality, as a preference over printing composite black pixels (CMY or CMYK) which are designated during initial rasterization of the objects. As shown in FIG. 6, with conventional processing via black extraction, even black pixels in element 142A of text object 116A bordering color pixels (in element 142A) in another object 114A remain true black pixels (K), thereby contributing to black-color bleed.

In contrast, text object 116B and graphics object 114B represent objects identified as having color and adjacent-to-color by application of method 200 (FIG. 4) and/or use of printer driver 20 with raster mechanism 90 and/or black-color interface optimizer 94 (FIG. 2). Accordingly, as represented by elements 140B, 142B, and 144B, all black pixels in graphics object 114B if any, are designated to remain as composite black pixels and not be subject to conversion to true black pixels via black extraction as would otherwise occur in conventional processing. In one embodiment, maintaining this composite black pixel designation corresponds to half-tone printing these pixels as a combination of both true black pixels (K) and a composite black pixel group of cyan (C), magenta (M), and yellow (Y).

In addition, all black pixels in text object 16B, represented by both elements 142B and 144B, will maintain their designation as composite black pixels, suspending the conventional black extraction step. In one embodiment, this composite black pixel designation corresponds to half-tone printing these pixels as a combination of both true black pixels (K) and a composite black pixel group of cyan (C), magenta (M), and yellow (Y). This composite black pixel designation is applied comprehensively (i.e., to all pixels) within these color objects and adjacent-color objects to enable rapid processing to efficiently minimize bleed between the color pixels (M and Y) in graphics object 114B relative to the black pixels (CMYK) in text object 116B In addition, element 144B of text object 116B includes composite black pixels (CMYK) that are designated as composite black pixels even though they are located remotely relative to color pixels of element 140B of graphics object (GO) 112B (and would otherwise not be expected to cause bleed). This object-wide designation takes place in the interest of rapid processing, even though the black pixels in element 144B are not immediately adjacent to the color pixels or black-color interface in element 142B, for the reasons explained in association with element 130B of FIG. 5.

Embodiments of the present invention are directed to rapid processing of document image data while minimizing ink bleed at black-color interfaces. When one or more objects that are identified as having color anywhere in the object (or near it), embodiments of the invention avoid pixel-by-pixel analysis of each of those objects. Instead, all of the black pixels in the identified color objects are designated to be maintained as composite black pixels, and not replaced by a true black pixel. Some of these composite black pixels in the identified color objects will be at a black-color interface, and maintaining the composite black pixel will thereby minimize black-color bleed at that interface. Other composite black pixels in the identified objects will be remote from a black-color interface (and not affect black-color bleeding), but are maintained as composite black pixels anyway to expedite processing of the document image data. Black pixels in the document image data that fall within non-color objects can still be printed according to conventional printer driver protocols, which typically perform a black extraction step to designate these black pixels in non-color objects for printing as pure black or true black (K) ink. This feature can maintain use of the highest quality black inks in areas of a document not having any color.

Embodiments of the present invention result in fast processing of document image data since it can be implemented in one-pass printing and avoids analyzing every pixel to identify black-color interface on a pixel-by-pixel basis. Moreover, these embodiments simplify black pixel designation by treating all black pixels in the identified objects in the same manner. These features reduce the complexity, processing time, and cost associated with printer drivers. Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of processing document image data for printing, the method comprising:
    rasterizing all objects in the document image data into a bitmap format including converting black portions of all the respective objects into composite black pixels;
    identifying, among all the respective objects in the document image data, color objects that contain color and color-border black objects that omit color while bordering color objects;
    maintaining all composite black pixels in the identified color-border black objects as composite black pixel designations without substitution to true black pixels; and
    generating print data in which the composite black pixel designations are to be half-tone printed on a print medium as a portion of composite black ink and a portion of true black ink.

2. The method of claim 1 and further comprising:
    identifying, among all the respective objects in the document image data, isolated black objects that do not contain color and are not adjacent to color objects;
    replacing all composite black pixel designations in the identified isolated black objects with true black pixel designations; and
    generating print data in which the true black pixel designations of the isolated black objects are to be printed as true black ink on the print medium.

3. The method of claim 1 wherein the color-border black objects and color objects in the document image data include at least one of a text object and a vector graphic object.

4. The method of claim 1, further comprising selectively deactivating the maintaining of all composite black pixels in the identified near-color black objects as composite black pixels.

5. The method of claim 4 wherein selectively deactivating the designation of all composite black pixels is performed for printing on photo paper.

6. The method of claim 1, further comprising:
    printing the color pixels onto the print medium and half-tone printing the designated composite black pixels onto the print medium as the portion of composite black ink and the portion of pure black ink.

7. The method of claim 1 wherein the composite black ink comprises a combination of color inks including cyan ink, magenta ink, and yellow ink.

8. The method of claim 7 wherein printing the color inks and the true black ink onto the print medium is performed from a single orifice plate of a printhead.

9. The method of claim 7 wherein printing the print data is performed on plain paper.

10. A printer driver comprising:
    a raster mechanism configured to convert all vector objects into bitmap data for printing, including a black extractor configured to replace all composite black pixels in the vector objects with true black pixels;
    a color object locator configured to identify all color vector objects of all the respective vector objects that include color and to identify all near-color black vector objects of all the respective vector objects that are positioned alongside, but not in contact with, the identified color vector objects; and
    a black extraction switch configured to suspend operation of the black extractor for all composite black pixels in the identified color vector objects and the identified near-color black vector objects to maintain their designation as composite black pixels to enable half-tone printing as a portion of true black ink and a portion of composite black ink.

11. The printer driver of claim 10 wherein the color object locator determines whether the color vector object includes color and whether the near-color black vector object includes color by identifying at least one color pixel in the respective identified color vector object and identified near-color black vector object.

12. The printer driver of claim 10 wherein the color object locator determines whether a vector object has color by examining at least one of meta-data and header information of the vector object.

13. The printer driver of claim 10 wherein the black extraction switch is configured for selective activation and deactivation.

14. The printer driver of claim 10 wherein the black extraction switch is disposed in the raster mechanism.

15. The printer driver of claim 10 wherein the printer driver comprises a black-color interface optimizer in communication with the raster mechanism and that includes the color object locator and the black extraction switch.

16. A printer comprising:
    an ink supply including a color ink reservoir and a black ink reservoir;
    a printhead in fluid communication with the ink supply and including a single orifice plate;
    a printer driver stored in memory and configured to convert vector objects in document image data from a raster format into a bitmap format for printing with all black portions being designated as composite black pixels and with the printer driver including:

a black extractor configured to replace all composite black pixels in the vector objects with true black pixels;

a color object locator configured to identify, in the document image data, color objects that include color and to identify near-color objects that are positioned to border color objects or that are positioned alongside, but spaced apart form, color objects; and a black extraction switch configured to maintain a composite black pixel designation for all black pixels in the identified color objects and the identified near-color objects without conversion to a true black pixel via the black extractor of printer driver.

17. A printer driver comprising:

means for converting text objects, and graphics objects in document image data into bitmap data for printing, including means for designating all black portions in the text objects and in the graphics objects as composite black pixels and means for selectively replacing composite black pixels with true black pixels;

means for identifying, among the respective converted text objects and converted graphics objects in the document image data, color text objects and color graphics objects that include color pixels, respectively, and for identifying color-overlap text objects and color-overlap graphics objects that overlap color objects, respectively; and means for blocking performance, of the means for selectively replacing composite black pixels, to maintain all black pixels as composite black pixels in the identified color text objects, identified color graphics objects, identified color-overlap text objects, and identified color-overlap graphics objects.

18. The printer driver of claim 17 wherein the means for identifying comprises a module configured to determine whether the respective converted text objects and converted graphics objects in the document image data includes color by examining at least one of a meta data and a header information of the respective text objects and respective graphics objects.

19. The printer driver of claim 17 wherein the means for identifying is configured to determine, independent of a pixel-by-pixel analysis of color-black interfaces for all pixels in the identified object, whether the text object or the graphics object includes color.

20. A computer-readable medium having computer-executable instructions for performing a method of processing document image data for printing, the method comprising:

rasterizing all objects in the document image data into a bitmap format including converting all black portions of the respective objects into composite black pixels;

identifying, among all the respective objects in the document image data, color objects that contain color and color-border black objects that omit color while bordering color objects;

maintaining all composite black pixels in the identified color-border black objects as composite black pixel designations without substitution to true black pixels; and generating print data in which the composite black pixel designations are to be half-tone printed on a print medium as a portion of composite black ink and a portion of true black ink.

21. The medium of claim 20 wherein the method further comprises:

identifying isolated black objects in the document image data that do not contain color and are not adjacent to color objects;

replacing all composite black pixel designations in the identified isolated black objects with true black pixel designations; and generating print data in which the true black pixel designations are to be printed as true black ink on the print medium.

22. The medium of claim 20 wherein the color-border black objects and color objects in the document image data include at least one of a text object and a vector graphic object.

23. The medium of claim 20 wherein the composite black ink designated in the generated print data comprises a combination of color inks including cyan ink, magenta ink, and yellow ink, and wherein the generated print data specifies printing the color inks and the true black ink onto the print medium via a single orifice plate of a printhead.

* * * * *

UNITED STATES PATENT AND TRADEMARK OFFICE
CERTIFICATE OF CORRECTION

PATENT NO. : 7,246,880 B2  Page 1 of 1
APPLICATION NO. : 11/044859
DATED : July 24, 2007
INVENTOR(S) : George C Ross et al.

It is certified that error appears in the above-identified patent and that said Letters Patent is hereby corrected as shown below:

In column 10, line 36, delete "16B" and insert -- 116B --, therefor.

In column 13, line 2, in Claim 16, after "black" delete "pixels" and insert -- pixel --, therefor.

In column 13, line 7, in Claim 16, delete "form" and insert -- from --, therefor.

In column 13, line 14, in Claim 17, after "objects" delete ",".

Signed and Sealed this

Sixteenth Day of September, 2008

JON W. DUDAS
*Director of the United States Patent and Trademark Office*